(12) United States Patent
Nishimura et al.

(10) Patent No.: US 7,532,871 B2
(45) Date of Patent: May 12, 2009

(54) RECEIVER

(75) Inventors: Daisuke Nishimura, Osaka (JP); Hiroaki Ozeki, Osaka (JP); Yasuo Ooba, Shiga (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 11/517,673

(22) Filed: Sep. 8, 2006

(65) Prior Publication Data

US 2007/0060080 A1    Mar. 15, 2007

(30) Foreign Application Priority Data

Sep. 9, 2005    (JP) .............................. 2005-261537

(51) Int. Cl.
*H04B 1/18* (2006.01)
*H04B 7/08* (2006.01)

(52) U.S. Cl. .................... 455/130; 455/132; 455/176.1; 455/180.1; 455/188.1; 455/272

(58) Field of Classification Search ............. 455/78–83, 455/132–141, 176.1, 168.1, 180.1, 180.2, 455/188.1, 272–277.1, 552.1–553.1
See application file for complete search history.

(56) References Cited

U.S. PATENT DOCUMENTS

| | | | | |
|---|---|---|---|---|
| 6,360,089 | B1 * | 3/2002 | Saitoh ........................ | 340/7.1 |
| 6,466,768 | B1 * | 10/2002 | Agahi-Kesheh et al. ........ | 455/78 |
| 7,155,252 | B2 * | 12/2006 | Martin et al. ............. | 455/553.1 |
| 2002/0009982 | A1 * | 1/2002 | Kim ........................... | 455/135 |
| 2002/0081987 | A1 * | 6/2002 | Yoshida et al. ........... | 455/277.1 |
| 2003/0050032 | A1 * | 3/2003 | Masaki ....................... | 455/272 |
| 2004/0224643 | A1 * | 11/2004 | Nakai .......................... | 455/78 |
| 2005/0090207 | A1 * | 4/2005 | Oiwa .......................... | 455/101 |
| 2005/0119025 | A1 * | 6/2005 | Mohindra et al. ......... | 455/552.1 |
| 2005/0227631 | A1 * | 10/2005 | Robinett ...................... | 455/83 |
| 2005/0277387 | A1 * | 12/2005 | Kojima et al. ................. | 455/78 |

FOREIGN PATENT DOCUMENTS

JP    2005-130279    5/2005

* cited by examiner

*Primary Examiner*—Simon D Nguyen
(74) *Attorney, Agent, or Firm*—RatnerPrestia

(57) ABSTRACT

A receiver includes (i) a first filter coupled to a first antenna and passing a signal in a first frequency band, (ii) a first receiver part for receiving the signal in the first frequency band from one of input terminals thereof coupled on the output side of the first filter, (iii) a second filter coupled to the first antenna and passing a signal in a second frequency band, and (iv) a second receiver part for receiving the signal in the second frequency band from one of input terminals thereof coupled on the output side of the second filter. The receiver makes diversity reception of a signal in a third frequency band received from the other input terminal of the first receiver part, and a signal in the third frequency band received from the other input terminal of the second receiver part.

14 Claims, 2 Drawing Sheets

RECEIVER

BACKGROUND OF THE INVENTION

1. Field of the Invention

The present invention relates to a receiver that receives radio-frequency (RF) signals.

2. Background Art

Japanese Patent Unexamined Publication No. 2005-130279 discloses a conventional receiver for diversity reception.

Hereinafter, a description is provided of a receiver for diversity reception, with reference to FIG. 4. In FIG. 4, receiver 101 includes first filter 103 for passing signals in a first frequency band, and second filter 104 for passing signals in a second frequency band, both connected on the output side of first antenna 102 in parallel with each other. Receiver 101 includes switch 131 for switching the signals in the first frequency band from first filter 103 and the signals in the second frequency band from second filter 104. Receiver 101 further includes first receiver part 109 having one input terminal connected to the output side of switch 131, and the other input terminal connected to the output side of second antenna 105, and second receiver part 110 connected to the output side of third antenna 107. Receiver 101 also synthesizes the signals in a third frequency band from second antenna 105 and the signals in the third frequency band from third antenna 107 in demodulator 111, using first receiver part 109 and second receiver part 110, for diversity reception. Demodulator 111 includes first demodulator part 123 connected on the output side of first receiver part 109, and second demodulator 124 connected on the output side of second receiver part 110. Synthesizer 133 makes diversity synthesis of the respective demodulated signals.

Receiver 101 includes a channel selector (not shown). When the signals in the first frequency band are selected, the channel selector changes switch 131 to the side of first filter 103, allowing first receiver part 109 to receive the signals in the first frequency band. When the signals in the second frequency band are selected, the channel selector changes switch 131 to the side of second filter 104, allowing first receiver part 109 to receive the signals in the second frequency band. Further, when the signals in the third frequency band are selected, the channel selector allows first receiver part 109 and second receiver part 110 to make diversity reception of the signals in the third frequency band.

However, conventional receiver 101 has switch 131 for changing the channel between first antenna 102 and first receiver part 109, and the received signals are decreased (lost) in switch 131. For this reason, the level of the signals received from first antenna 102 decreases in the input terminals of first receiver part 109 and second receiver part 110; thus the reception sensitivity deteriorates.

SUMMARY OF THE INVENTION

A receiver of the present invention includes (i) a first filter coupled to one of terminals on the output side of a first antenna and passing a signal in a first frequency band, (ii) a first receiver part for receiving the signal in the first frequency band from one of input terminals thereof coupled on the output side of the first filter, (iii) a second filter coupled to the other one of the terminals on the output side of the first antenna and passing a signal in a second frequency band, and (iv) a second receiver part for receiving the signal in the second frequency band from one of input terminals thereof coupled on the output side of the second filter. The receiver makes diversity reception of a signal in a third frequency band received from the other one of the input terminals of the first receiver part, and a signal in the third frequency band received from the other one of the input terminals of the second receiver part.

With this structure, the first receiver part receives the signal in the first frequency band from the first antenna, and the second receiver part receives the signal in the second frequency band from the first antenna, without through a switch causing loss of received signals. This structure improves the strength of the signals received by the first and second receiver parts from the first antenna, and improves the reception sensitivity.

DETAILED DESCRIPTION OF THE INVENTION

First Exemplary Embodiment

Figure 1:
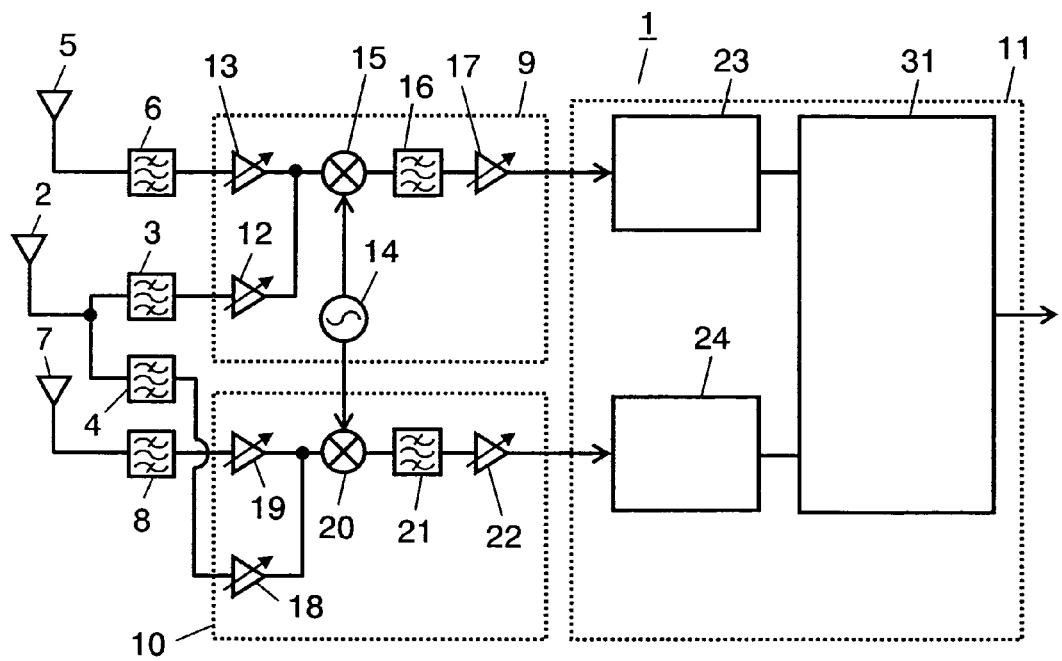
FIG. 1 is a block diagram showing a structure of a receiver in accordance with a first exemplary embodiment of the present invention.

Hereinafter, a description is provided of a receiver in accordance with the first exemplary embodiment of the present invention, with reference to FIG. 1. FIG. 1 is a block diagram showing a structure of receiver 1 of the first exemplary embodiment.

Receiver 1 includes first filter 3 connected to one of terminals on the output side of first antenna 2, and second filter 4 connected to the other of the terminals on the output side of first antenna 2. Receiver 1 also includes fourth filter 6 connected on the output side of second antenna 5, and fifth filter 8 connected on the output side of third antenna 7. Receiver 1 includes first receiver part 9 that has one of input terminals thereof connected on the output side of first filter 3 and the other of the input terminals connected on the output side of fourth filter 6, and second receiver 10 that has one of the input terminals connected on the output side of second filter 4 and the other of the input terminals connected on the output side of fifth filter 8. Receiver 1 further includes demodulator 11 connected on the output side of first receiver part 9 and second receiver part 10.

First antenna 2, for example, is an antenna for very high frequencies (VHF), and receives signals in a frequency band ranging from approx. 90 to 220 MHz (inclusive).

Second antenna 5 and third antenna 7, for example, are those for ultra high frequencies (UHF), and receive signals in a frequency band ranging from approx. 470 to 770 MHz (inclusive).

First filter 3 is made of a surface acoustic wave (SAW) filter, for example. The filter passes signals via Channel 7 in the VHF band, i.e. a first frequency band, among the signals from first antenna 2. In other words, first filter 3 attenuates the signals outside of Channel 7 in the VHF band, particularly those via Channels 8 and 6, which cause upper- and lower-adjacent interferences with signals via Channel 7 in the VHF band.

Second filter 4 is made of a SAW filter, for example. The filter passes signals via Channel 8 in the VHF band, i.e. a second frequency band, among the signals from first antenna 2. In other words, second filter 4 attenuates the signals outside of Channel 8 in the VHF band, particularly those via Channels 7 and 9, which cause lower- and upper-adjacent interferences with those via Channel 8 in the VHF band.

On the output side of first antenna 2, a switch for changing first filter 3 and second filter 4 can be provided. This switch can prevent first filter 3 and second filter 2 from impedance coupling.

Fourth filter 6 and fifth filter 8 are made of a ceramic filter or laminated filter, for example. Fourth filter 6 and fifth filter 8 pass signals in the UHF band, i.e. in a third frequency band, among the signals from second antenna 5 and third antenna 7, respectively. In other words, fourth filter 6 and fifth filter 8 attenuate signals outside of the UHF band (in the VHF band and cellular band), which cause interference.

First receiver part 9 includes first radio-frequency (RF) amplifier 12 for amplifying signals from first filter 3, and third RF amplifier 13 for amplifying signals from fourth filter 6. First receiver part 1 also includes first local oscillator 14 for sending local oscillation signals, and a first mixer 15 for mixing signals from first RF amplifier 12 or third RF amplifier 13 with the local oscillation signals. Further, first receiver part 9 includes first intermediate-frequency (IF) filter 16 for suppressing unnecessary signals other than desired ones from first mixer 15, and first IF amplifier 17 for amplifying the signals from first IF filter 16.

Similar to first receiver part 9, second receiver part 10 includes second RF amplifier 18, fourth RF amplifier 19, second mixer 20, second IF filer 21, and second IF amplifier 22. Second mixer 20 receives local oscillation signals from first local oscillator 14 in first receiver part 9. With this structure, second receiver part 10 needs not generate local oscillation signals, and thus power consumption of the receiver can be reduced.

Demodulator 11 includes first demodulator part 23 connected on the output side of first IF amplifier 17, and second demodulator 24 connected on the output side of second IF amplifier 22. Synthesizer 31 makes diversity synthesis of the respective demodulated signals.

Receiver 1 has a channel selector (not shown). When reception via Channel 7 in the VHF band is selected, the selector allows first receiver part 9 to receive signals via Channel 7 in the VHF band, and powers off second receiver part 10. When reception via Channel 8 in the VHF band is selected, the selector allows second receiver part 10 to receive signals via Channel 8 in the VHF band, and powers off first receiver part 9 except for first local oscillator 14. When reception via the UHF band is selected, the channel selector allows first receiver part 9 and second receiver part 10 for diversity reception of signals in the UHF band. Alternatively, the channel selector allows only one of first receiver part 9 and second receiver part 10 to receive signals in the UHF band (single reception). The diversity reception is activated when receiving capability is deteriorated by phasing in high-speed mobile receiving state. In a stable receiving state, e.g. stationary state, single reception is performed. For the single reception, when the first receiver part is used, second receiver part 10 is powered off. When the second receiver part is used, first receiver part 9 except for first local oscillator 14 is powered off. In this manner, power consumption of the receiver can be reduced.

With the above structure, first receiver part 9 receives signals via Channel 7 in the VHF band from first antenna 2, and second receiver part 10 receives signals via Channel 8 in the VHF band from first antenna 2, without passing through a switch that causes loss of the received signals. This structure improves the strength of the signals the first and second receiver parts receive from the first antenna, and reception sensitivity. Because no switch is disposed in receiver 1, the area of receiver 1 can be reduced.

In the first exemplary embodiment, first receiver part 9 and second receiver part 10 are separate ones. However, first receiver part 9 and second receiver part 10 can be integrated into one receiver part. Further, first receiver part 9, second receiver part 10, and demodulator 11 can be integrated into one receiver part. The integration of the receiver parts allows terminals, such as a power terminal and ground terminal, to be shared among some components and eliminates external components, such as a noise-reduction capacitor. As a result, the area of receiver 1 can be reduced.

First antenna 2 and second antenna 5 can be integrated into one antenna. This structure can simplify the circuitry.

Second Exemplary Embodiment

Figure 2:
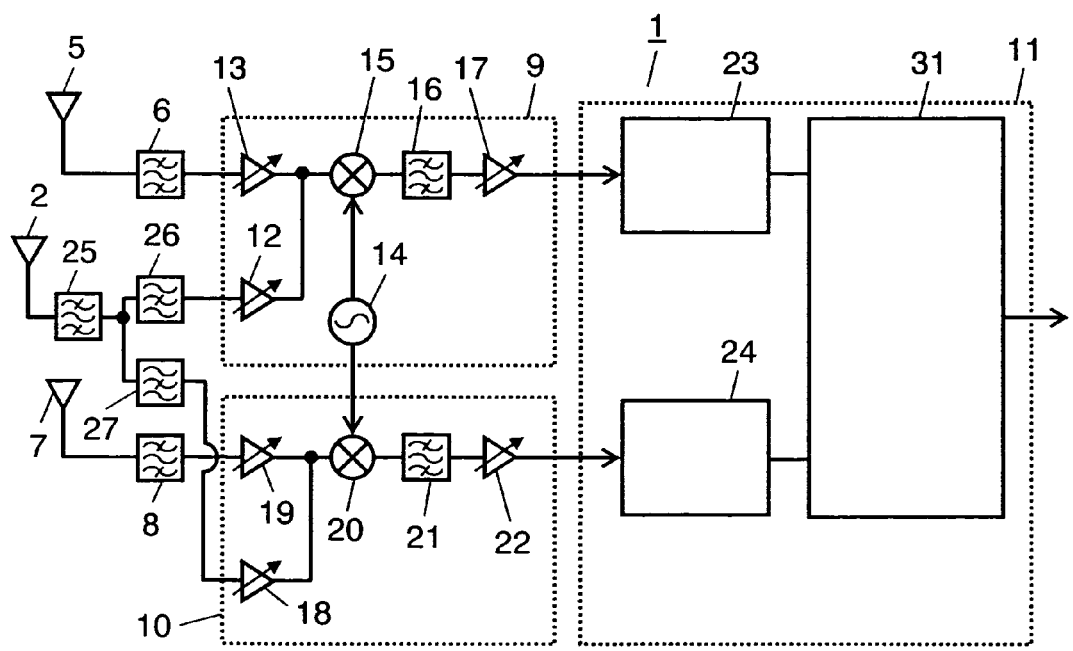
FIG. 2 is a block diagram showing a structure of a receiver in accordance with a second exemplary embodiment of the present invention.

Hereinafter, a description is provided of a receiver in accordance with the second exemplary embodiment of the present invention, with reference to FIG. 2. FIG. 2 is a block diagram showing a structure of receiver 1 of the second exemplary embodiment. Unless otherwise specifically described, this embodiment is similar to the first exemplary embodiment.

The second exemplary embodiment is different from the first exemplary embodiment in the following point. As shown in FIG. 2, third filter 25 is connected on the input side of sixth filter 26, and seventh filter 27 on the output side of the first antenna.

Third filter 25 is made of a surface acoustic wave (SAW) filter, for example, and passes signals via Channel 7 in the VHF band, i.e. a first frequency band, and signals via Channel 8 in the VHF band, i.e. a second frequency band. In other words, third filter 25 attenuates signals outside of Channel 7 in the VHF band and Channel 8 in the VHF band, particularly signals via Channel 6 interfering with signals via upper-adjacent Channel 7 in the VHF band and signals via Channel 9 interfering with signals via lower-adjacent Channel 8 in the VHF band.

Sixth filter 26 and seventh filter 27 are made of a ceramic filter, laminated filter, and a discrete filter made by combination of a capacitor and coil, for example. Each of sixth filter 26 and seventh filter 27 attenuates the signals in a specific frequency band only, among those supplied from third filter 25. Sixth filter 26 passes the signals via Channel 7 in the VHF band, i.e. the first frequency band, and attenuates signals via Channel 8, i.e. the second frequency band, that interfere with signals via lower-adjacent Channel 7. Seventh filter 27 passes the signals via Channel 8 in the VHF band, i.e. the second frequency band, and attenuates signals via Channel 7, i.e. the first frequency band, that interfere with signals via upper-adjacent Channel 8 in the VHF band.

In other words, receiver 1 of the second exemplary embodiment of the present invention includes the third filter connected on the output side of the first antenna and passing the signals in the first and second frequency bands. Receiver 1 also includes the sixth filter connected to one of the terminals on the output side of the third filter and passing the signals outside of the second frequency band, and a first receiver part for receiving the signals in the first frequency band from one of input terminals thereof connected on the output side of the sixth filter. Receiver 1 also includes the seventh filter connected to the other of the terminals on the output side of the third filter and passing the signals outside of the first frequency band, and a second receiver for receiving signals in the second frequency band from one of input terminals thereof connected on the output side of the seventh filter. With this structure, receiver 1 can make diversity reception of the signals in the third frequency band received from the other input terminal of the first receiver part and the signals in the third frequency band received from the other input terminal of the second receiver part.

This structure can reduce one SAW filter from the components of the first exemplary embodiment.

Because third filter 25 has a larger specific bandwidth than those of first filter 3 and second filter 4 of the first exemplary embodiment, the loss in the band decreases. As a result, reception sensitivity is improved.

First antenna 2 and second antenna 5 can be integrated into one antenna. This structure can simplify the circuitry.

Third Exemplary Embodiment

Figure 3:
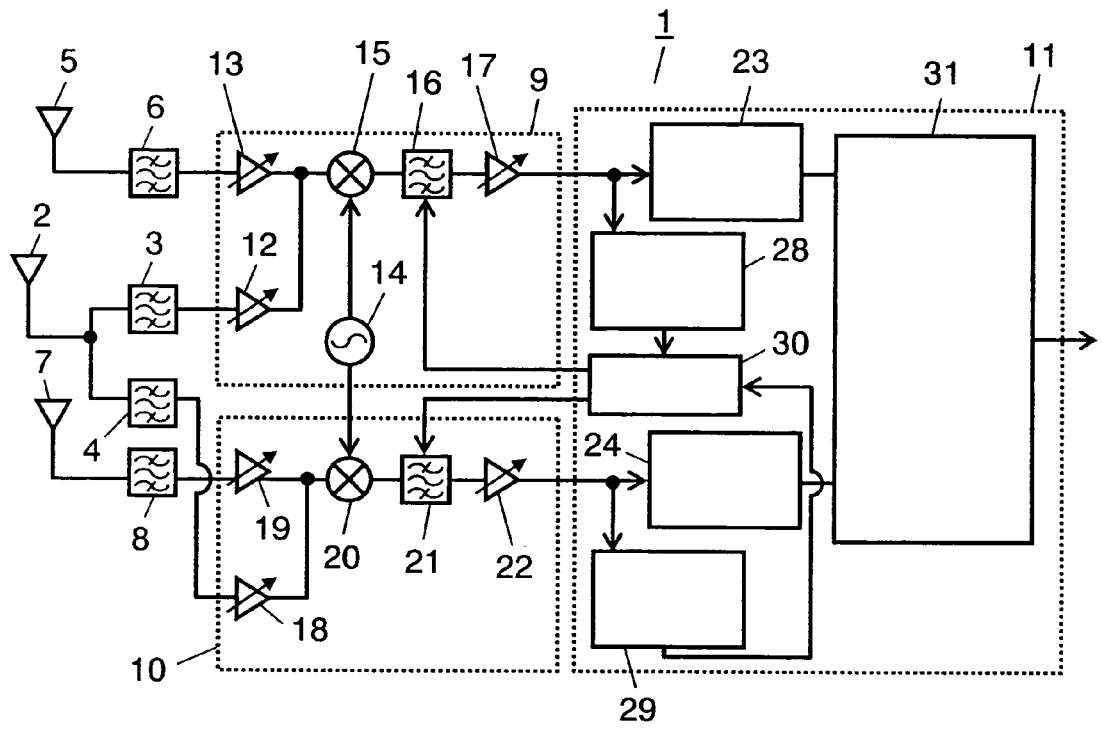
FIG. 3 is a block diagram showing a structure of a receiver in accordance with a third exemplary embodiment of the present invention.
Figure 4:
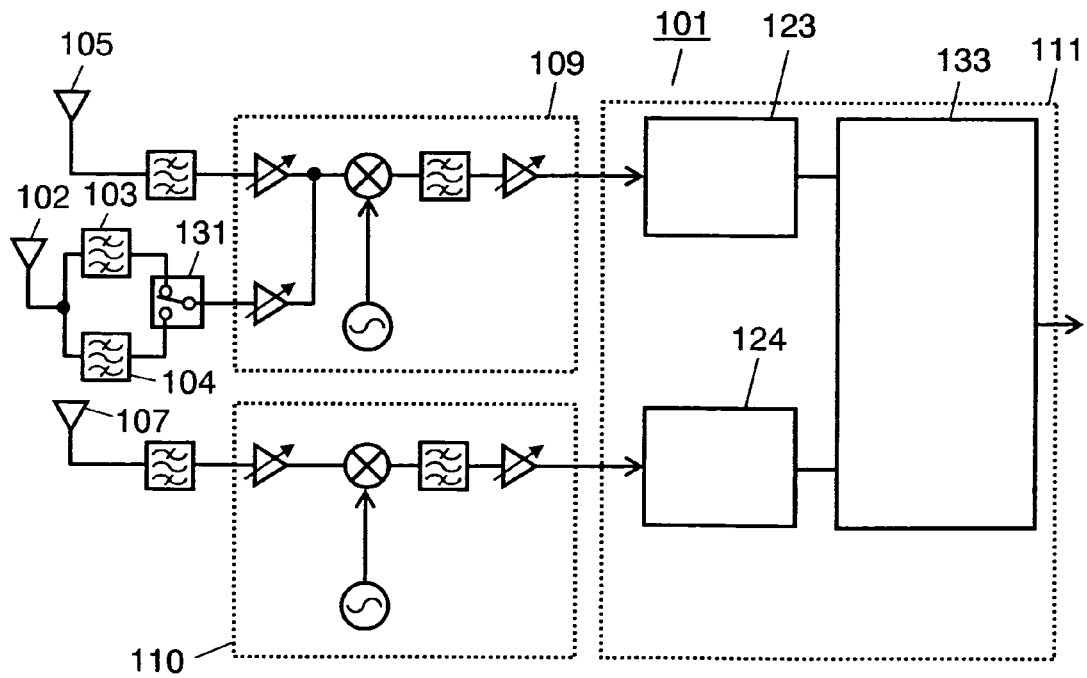
FIG. 4 is a block diagram showing a structure of a conventional receiver.

Hereinafter, a description is provided of receiver 1 in accordance with the third exemplary embodiment of the present invention, with reference to FIG. 3. FIG. 3 is a block diagram showing a structure of receiver 1 of the third exemplary embodiment. Unless otherwise specifically described, this embodiment is similar to the first exemplary embodiment.

The third exemplary embodiment is different from the first exemplary embodiment in the following points. When first receiver part 9 receives desired signals via Channel 7 in the VHF band, the receiver detects the strength of the interfering signals via Channel 8 in the VHF band received by second receiver part 10. When second receiver part 10 receives desired signals via Channel 8 in the VHF band, the receiver detects the strength of the interfering signals via Channel 7 in the VHF band received by first receiver part 9.

Receiver 1 includes first detector 28 connected on the output side of first receiver part 9, second detector 29 connected on the output side of second receiver part 10, and controller 30 connected on the output sides of first detector 28 and second detector 29. One of the output terminals of controller 30 is connected on the input side of first intermediate-frequency (IF) filter 16. The other of the output terminals of controller 30 is connected on the input side of second IF filter 21.

First detector 28 detects the strength of the signals via Channel 7 in the VHF band received by first receiver 9, and supplies the signals indicating the strength of the detected signals to controller 30. The strength of the signals is a voltage value of an automatic gain control (AGC) output, for example. With reference to FIG. 3 of the third exemplary embodiment, first detector 28 is connected on the output side of first receiver part 9. However, first detector 28 can be connected to any portion on the output side of first filter 3, for example, inside of first receiver part 9.

Second detector 29 detects the strength of the signals via Channel 8 in the VHF band received by second receiver 10, and supplies the signals indicating the strength of the detected signals to controller 30. With reference to FIG. 3 of the third exemplary embodiment, second detector 29 is connected on the output side of second receiver part 10. However, second detector 29 can be connected to any portion on the output side of second filter 4, for example, inside of second receiver part 10.

In the third exemplary embodiment, second mixer 20 is structured to receive local oscillation signals from first local oscillator 14 in first receiver part 9. Second mixer 20 can also be structured to receive local oscillation signals from a local oscillator (not shown) in second receiver part 10. With this structure, connection of first detector 28 on the output side of first IF filter 16 and second detector 29 on the output side of second IF filter 21 allows the strengths of interference signals via Channels 7 and 8 in the VHF band to be detected more accurately.

When first receiver part 9 receives desired signals via Channel 7 in the VHF band, controller 30 fixes the gain of fourth RF amplifier 19 and receives the signals indicating the strength of the signals interfering with those via Channel 8 in the VHF band from second detector 29. When the strength of the interference signals detected by second detector 29 is at a predetermined level or higher, controller 30 increases the attenuation of the signals interfering with those via Channel 8 in the VHF band in first IF filter 16. On the other hand, when the strength of the interference signals detected by second detector 29 is below the predetermined level, controller 30 decreases the attenuation of the signals interfering with those via Channel 8 in the VHF band in first IF filter 16.

When second receiver part 10 receives desired signals via Channel 8 in the VHF band, controller 30 fixes the gain of first RF amplifier 12 and receives the signals indicating the strength of the signals interfering with those via Channel 7 in the VHF band from first detector 28. When the strength of the interference signals detected by first detector 28 is at a predetermined level or higher, controller 30 increases the attenuation of the signals interfering with those via Channel 7 in the VHF band in second IF filter 21. On the other hand, when the strength of the interference signals detected by first detector 28 is below the predetermined level, controller 30 decreases the attenuation of the signals interfering with those via Channel 7 in the VHF band in second IF filter 21.

In other words, in receiver 1, while one of the receiver parts is receiving the desired signals, the other one of the receiver parts detects the strength of the received interference signals, and controls the IF filter in the receiver part receiving the desired signals, based on the detected results. With this structure, the attenuation characteristics of the IF filters are made steep only when the strength of the interference signals of the adjacent channel is higher than a predetermined level. Thus, the power consumption can be reduced.

In the third exemplary embodiment, the output terminals of controller 30 are connected to first IF filter 16 and second IF filter 21; however, the controller can be connected to anywhere inside of first receiver part 9 and second receiver part 10. One of first receiver part 9 and second receiver part 10 that detects the strength of interference signals can be without receiving capability. For example, when the output terminal of controller 30 is connected to the input terminal of first mixer 15 or the input terminal of second mixer 20, the strength of the interference signals can be detected by simply operating second RF amplifier 18 or first RF amplifier 12. Thus, the power consumption of receiver 1 can be reduced.

The strength of the interference signals need not always be detected. A receiver can be structured to activate the detection capability only when a predetermined bit error rate cannot be obtained.

What is claimed is:

1. A receiver including:
   (i) a first filter coupled to one of terminals on an output side of a first antenna and passing a signal in a first frequency band;
   (ii) a first receiver part for receiving the signal in the first frequency band from one of input terminals thereof coupled on an output side of the first filter;
   (iii) a second filter coupled to an other one of the terminals on the output side of the first antenna and passing a signal in a second frequency band; and (iv) a second receiver part for receiving the signal in the second frequency band from one of input terminals thereof coupled on an output side of the second filter;

wherein the receiver makes diversity reception of a signal in a third frequency band received from an other of the input terminals of the first receiver part, and a signal in the third frequency band received from an other of the input terminals of the second receiver part.

2. The receiver of claim 1, further comprising:
(i) a second detector coupled on the output side of the second filter and detecting a strength of a signal received by the second receiver part; and
(ii) a controller controlling the first receiver part based on a signal indicating a strength of a signal supplied from the second detector.

3. The receiver of claim 2, wherein the first frequency band and the second frequency band are adjacent to each other.

4. The receiver of claim 1, further comprising:
(i) a first detector coupled to the output side of the first filter and detecting a strength of a signal received by the first receiver part; and
(ii) a controller controlling the second receiver part based on a signal indicating a strength of a signal supplied from the first detector.

5. The receiver of claim 4, wherein the first frequency band and the second frequency band are adjacent to each other.

6. The receiver of claim 1, wherein the first antenna and the second antenna are integrated into one antenna.

7. The receiver of claim 1, wherein the first frequency band and the second frequency band are adjacent to each other.

8. A receiver comprising:
(i) a third filter coupled on an output side of a first antenna and passing signals in a first frequency band and a second frequency band;
(ii) a sixth filter coupled to one of terminals on an output side of the third filter and passing signals outside of the second frequency band;
(iii) a first receiver part for receiving a signal in the first frequency band from one of input terminals thereof coupled on an output side of the sixth filter;

(iv) a seventh filter coupled to an other of the terminals on an output side of the third filter and passing signals outside of the first frequency band; and
(v) a second receiver for receiving a signal in the second frequency band from one of input terminals thereof coupled on an output side of the seventh filter;

wherein the receiver makes diversity reception of the signal in a third frequency band received from an other of the input terminals of the first receiver part, and a signal in the third frequency band received from an other of the input terminals of the second receiver part.

9. The receiver of claim 8, further comprising:
(i) a second detector coupled on the output side of the seventh filter and detecting a strength of a signal received by the second receiver part; and
(ii) a controller controlling the first receiver part based on a signal indicating a strength of a signal supplied from the second detector.

10. The receiver of claim 9, wherein the first frequency band and the second frequency band are adjacent to each other.

11. The receiver of claim 8, further comprising:
(i) a first detector coupled to the output side of the sixth filter and detecting a strength of a signal received by the first receiver part; and
(ii) a controller controlling the second receiver part based on a signal indicating a strength of a signal supplied from the first detector.

12. The receiver of claim 11, wherein the first frequency band and the second frequency band are adjacent to each other.

13. The receiver of claim 8, wherein the first antenna and the second antenna are integrated into one antenna.

14. The receiver of claim 8, wherein the first frequency band and the second frequency band are adjacent to each other.

* * * * *